United States Patent
Lorenz et al.

(10) Patent No.: US 8,156,923 B2
(45) Date of Patent: Apr. 17, 2012

(54) METHOD AND SYSTEM FOR PRE-IGNITION CONTROL

(75) Inventors: Thomas Lorenz, Cologne (DE); Helmut Hans Ruhland, Eschweiler (DE); Moritz Klaus Springer, Hagen (DE); Georg Louven, Neuwied (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/090,940

(22) Filed: Apr. 20, 2011

(65) Prior Publication Data

US 2011/0265762 A1 Nov. 3, 2011

(51) Int. Cl.
*F02P 5/00* (2006.01)
*F02P 5/04* (2006.01)

(52) U.S. Cl. .................. 123/406.45; 123/436

(58) Field of Classification Search ........... 123/406.45, 123/436, 435; 701/103, 111
See application file for complete search history.

(56) References Cited

U.S. PATENT DOCUMENTS

| 5,905,193 A * | 5/1999 | Hashizume et al. ......... 73/35.09 |
| 2005/0120786 A1 * | 6/2005 | Tsujimura et al. .......... 73/119 R |

FOREIGN PATENT DOCUMENTS

| AT | 500991 A2 | 5/2006 |
| DE | 19510642 A1 | 6/1996 |
| DE | 102004009007 A1 | 10/2004 |
| DE | 10349855 A1 | 5/2005 |
| DE | 69916352 T2 | 5/2005 |
| EP | 1 722 090 A2 | 11/2006 |
| FR | 2504193 | * 10/1982 |

OTHER PUBLICATIONS

Lorenz, Thomas et al., "Method for operating a spark-ignition internal combustion engine, and internal combustion engine for carrying out such a method," German Application Serial No. 10 2010 003 143.7, Filed Mar. 23, 2010, 47 pages.
Examination Report of German Patent Application No. 10 2010 003 143.7, Sep. 6, 2010, 3 pages, German Patent and Trademark Office.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided to address engine pre-ignition. One or more cylinders are alternately rich and lean operated for a duration to reduce engine thermal loading while maintaining an exhaust air-to-fuel ratio around stoichiometry.

17 Claims, 6 Drawing Sheets

METHOD AND SYSTEM FOR PRE-IGNITION CONTROL

FIELD

The present description relates generally to methods and systems for controlling a vehicle engine to reduce the occurrence of pre-ignition.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

In one example, the risk of pre-ignition may be reduced by lowering the thermal loading of a vehicle engine. One example approach for reducing engine thermal loading is shown by Ito et al. in EP1722090 A2. Therein, a liquid cooling system including a coolant jacket coupled to a cylinder head is used to dissipate large quantities of heat. Further, fuel enrichment is carried out for a duration during conditions when high exhaust gas temperatures are expected. The heating and evaporation of the excess fuel injected during the enrichment However, the inventors herein have identified potential issues with such approach. As one example, the amount of heat dissipated by the cooling system may not be adequate to reduce the risk of engine thermal overloading, in particular, in the region where exhaust lines from different cylinders converge to form a common exhaust line. Thermal overloading issues may be exacerbated in boosted engines. As another example, the engine enrichment used to address thermal overloading may degrade fuel economy and exhaust emissions. Specifically, the enrichment may interfere with lean, or stoichiometric, exhaust conditions required for the operation of various exhaust emission control devices. Likewise, prolonged enrichment may lead to soot accumulation and coking of spark plugs, which in turn can generate misfires, and increase the propensity for pre-ignition. Soot may also deposit on the valves, hindering charge exchange and jeopardizing the sealing of the combustion chamber. That is, valves may actually be partially open when the valves are supposed to be fully closed.

Thus in one example, some of the above issues may be at least partly addressed by a method of operating an engine. In one example embodiment the method comprises, in response to an indication of pre-ignition, operating a first cylinder rich while operating a second cylinder lean for a first duration. The method further comprises, after the first duration, rich operating the second cylinder while lean operating the first cylinder for a second duration.

In this way, by using a combination of rich and lean operation in one or more engine cylinders thermal overloading of any given cylinder is reduced. Further, by alternating rich and lean operation of cylinders over a duration, issues related to prolonged cylinder enrichment or enleanment may be reduced.

In one example, during a first engine cycle, a first cylinder (or first group of cylinders) may be operated rich while a second cylinder (or second group of cylinders) is operated lean. Then, in the immediately following second engine cycle, the first cylinder may be operated lean while the second cylinder is operated rich. Likewise, in the immediately following third engine cycle, the first cylinder may be operated rich again while the second cylinder is operated lean again. The first and second cylinders may be selected and grouped based on their cylinder pre-ignition counts as well as their firing order. Further, in any given engine cycle, the enrichment of the rich-operated cylinder(s) may be adjusted to balance the enleanment of the lean-operated cylinder(s) to maintain the exhaust air-to-fuel ratio at stoichiometry.

In this way, a combination of enrichment and enleanment may be used to reduce cylinder overheating, thereby reducing the likelihood of cylinder pre-ignition events. By alternating enrichment with enleanment in a given cylinder over consecutive engine cycles, soot accumulation and spark plug coking in the cylinder can be reduced, thereby reducing the occurrence of cylinder misfires. At the same time, by adjusting the enleanment of some cylinders to match the enrichment of other cylinders, a stoichiometric exhaust gas air-to-fuel ratio may be maintained near a downstream emission control device. As such, this allows abnormal cylinder combustion events to be reduced without degrading exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
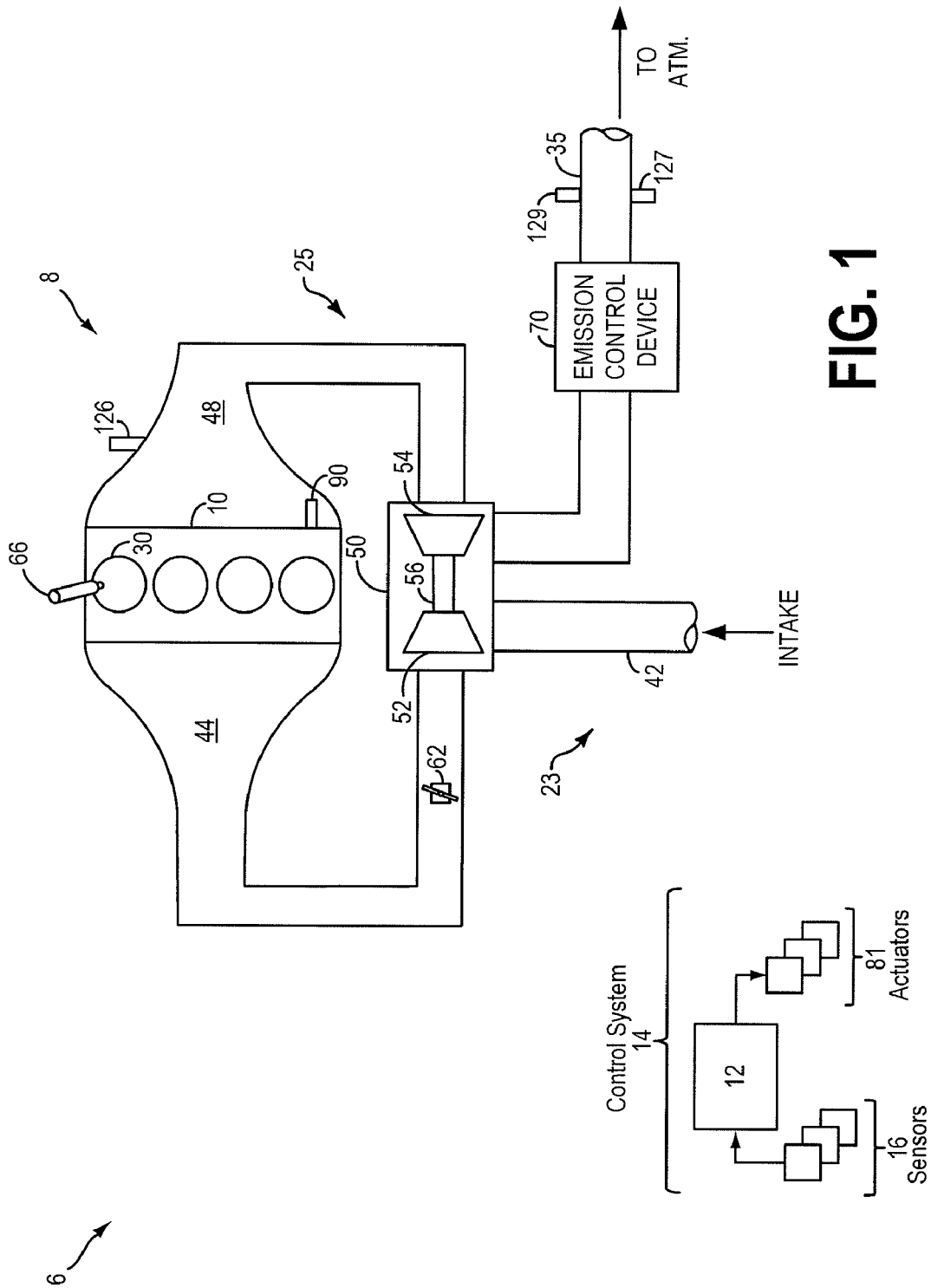
FIG. 1 shows an example engine system.
Figure 2:
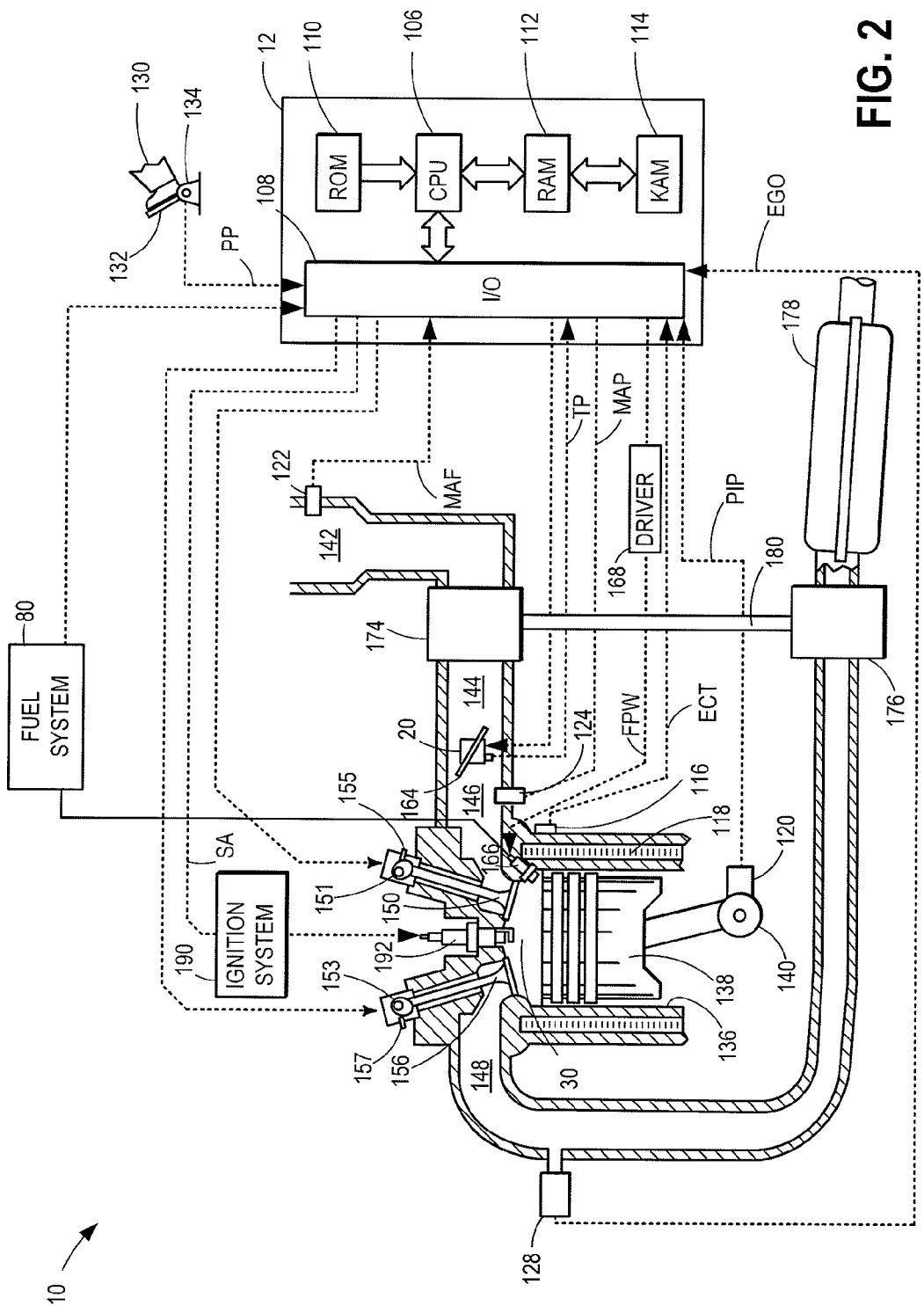
FIG. 2 shows an example combustion chamber.

The following description relates to systems and methods for alternating rich cylinder operation with lean cylinder operation in one or more engine cylinders, such as in the engine system of FIGS. 1-2, to reduce thermal overloading of an engine. In this way, the occurrence of abnormal combustion events related to pre-ignition may be reduced. An engine controller may select and group cylinders based on their pre-ignition history (e.g., pre-ignition count) and their firing order, for the alternating operation. The controller may be configured to perform control routines, such as the example routines of FIGS. 3-4, to selectively enrich a first group of cylinders while concomitantly enleaning a second group of cylinders, for a first duration, such as a first number of engine cycles. Immediately after the first duration, the operation of the cylinders may be switched such that the first group of cylinders are enleaned while the second group of cylinders are concomitantly enriched, for a second duration, such as a second number of engine cycles. Likewise, after the second duration, the first group of cylinders may be enriched again while the second group of cylinders are enleaned again. In this way, cylinder operation may be continuously alternated until an indication of pre-ignition is reduced. In every engine cycle, the enrichment of the enriched cylinders may be adjusted to match the enleanment of the enleaned cylinders, so as to maintain an exhaust air-to-fuel ratio around stoichiometry. By maintaining the exhaust air-to-fuel ratio at a desired ratio, the catalytic activity of a downstream emission control device may be maintained. Example cylinder operations are illustrated herein with reference to FIGS. 5-6.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include one (as depicted) or more knock sensors 90 distributed along engine block 11. When included, the plurality of knock sensors may be distributed symmetrically or asymmetrically along the engine block. Knock sensor 90 may be an accelerometer, or an ionization sensor.

An engine controller may be configured to detect and differentiate abnormal combustion events due to cylinder knocking from those indicative of cylinder pre-ignition based on the output (e.g., signal timing, amplitude, intensity, frequency, etc.) of the one or more knock sensors 90. In one example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows.

Mitigating actions taken by the engine controller to address knock may also differ from those taken by the controller to address pre-ignition. For example, knock may be addressed using ignition spark timing adjustments (e.g., spark retard) and EGR, while pre-ignition may be addressed using load-limiting, fuel enrichment, fuel enleanment, or a combination thereof, as elaborated in FIGS. 3-4.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensor(s) 90, temperature sensor 127, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with reference to FIGS. 3-4.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
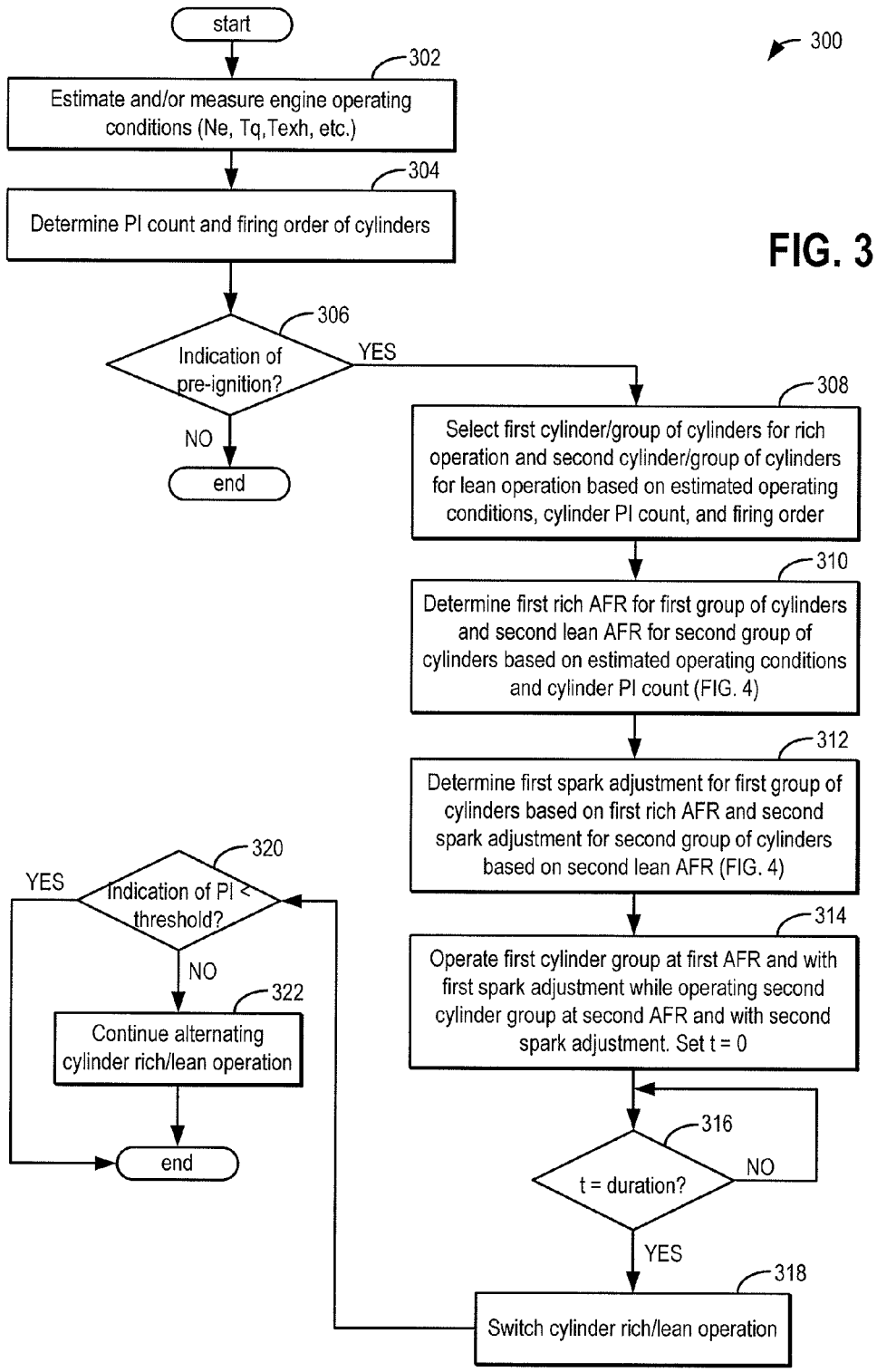
FIG. 3 shows a high level flow chart for alternating rich and lean operation in one or more engine cylinders in response to an indication of pre-ignition.

Now turning to FIG. 3, an example routine 300 is described for alternating cylinder rich and lean operation in response to an indication of pre-ignition while maintaining a stoichiometric exhaust air to fuel ratio. By periodically switching cylinder rich and lean operation, an occurrence of cylinder pre-ignition can be reduced by decreasing thermal loading of an engine.

At 302, engine operating conditions may be estimated and/or measured. These may include, for example, engine speed and load, torque, boost, manifold pressure (MAP), manifold aircharge temperature (MCT), exhaust temperature, air-fuel ratio (lambda), fuel octane content, etc. At 304, the pre-ignition count of each cylinder, as well as a cylinder firing order may be determined. In one example, the pre-ignition count of each cylinder may be stored in a look-up table in the database of the engine controller. The look-up table may be updated at regular intervals (e.g., every engine cycle, every 50 miles, every hour, etc.), or in response to an occurrence of cylinder pre-ignition.

The pre-ignition (PI) count for each cylinder may include a cylinder trip PI count and a cylinder lifetime PI count, for example. The cylinder trip PI count may include an estimate of a total number of pre-ignition events in the cylinder over the present trip, or engine cycle. The cylinder lifetime PI count may include an estimate of the total number of pre-ignition events in the cylinder over the lifetime of engine operation. Further, individual cylinder lifetime PI counts and trip PI counts may be used to determine an overall engine lifetime and trip PI count. As such, each cylinder's PI count may represent the given cylinder's pre-ignition history, and may correlate with each cylinder's propensity for further pre-ignition events.

At 306, it may be determined whether there is an indication of pre-ignition. In one example, the indication of pre-ignition may include a likelihood of pre-ignition, estimated based on the pre-ignition count of all the engine cylinders. The likelihood of pre-ignition may be further based on the estimated engine operating conditions, such as an exhaust temperature. In one example, if the exhaust gas temperature is higher than a threshold, or is expected to exceed the threshold (e.g., based on engine speed-load conditions), then pre-ignition may be likely. Alternatively, the indication of pre-ignition may include the detection of pre-ignition. As elaborated with reference to FIG. 1, an engine controller may detect abnormal combustion events related to pre-ignition, and differentiate them from cylinder knocking events, based on the output of one or more engine knock sensors. If an indication of pre-ignition is not confirmed at 306, the routine may be end.

In response to the indication of pre-ignition, at 308, a first cylinder and a second cylinder (or a first group and second group of cylinders) may be selected based on their respective pre-ignition counts, and further based on their firing order. The first cylinder (or first group of cylinders) may be selected for operating rich with an air-to-fuel ratio richer than stoichiometry for a duration, while the second cylinder (or group of cylinders) is selected for operating lean with an air-to-fuel ratio leaner than stoichiometry for the same duration. As such, each group of cylinders may include at least one engine cylinder.

Cylinders may be grouped based on their firing order such that consecutive cylinder combustion events are alternately rich or lean. This enables the dynamic wave phenomena in the exhaust passage of one cylinder group to have less effect on the other cylinder group. As such, each cylinder may have at least one exhaust outlet, for discharging exhaust gases from the cylinder, that is coupled to an exhaust passage. Further, the exhaust passages of cylinders in each group of cylinders may converge to form a common exhaust passage within the cylinder head of the engine (that is, an integrated exhaust manifold).

As one example, in an engine having at least three cylinders in an in-line arrangement, the first cylinder group may include the outer cylinders while the second cylinder group may include the remaining at least one inner cylinder. Cylinder grouping may be symmetric (that is, with an equal number of cylinders in each group) or asymmetric (that is, with an equal number of cylinders in each group). As an example of an asymmetric grouping, in a three-cylinder in-line engine, the first cylinder group may include the two outer cylinders while the second cylinder group may include the single inner cylinder. Herein, regardless of the ignition sequence of the cylinders, the two cylinders combined in the first cylinder group will have a short ignition interval of 240° C.A and a long ignition interval of 480° C.A. As an example of a symmetric grouping, in a four-cylinder in-line engine, the first cylinder group may include the two outer cylinders while the second cylinder group may include the two inner cylinders. Such a grouping makes allowance for the fact that the cylinders are ignited in the sequence 1-3-4-2 with the cylinders being numbered successively in series starting from an outer cylinder of the row. The grouping allows the two cylinders of the first cylinder group and the second cylinder group to each have an ignition interval of 360° C.A. In this way, by grouping cylinders based on their firing order, cylinders in each group may have an increased offset with regard to their firing in an engine cycle.

While asymmetric grouping is described above with reference to an engine with an odd number of cylinders, the same may also be performed in engines with an even number of cylinders. For example, in a four-cylinder in-line engine, the first cylinder group may comprise a single cylinder while the second cylinder group includes two cylinders. The fourth, remaining, cylinder may not be assigned to any of the groups. Herein, by grouping an odd number of cylinders with the corresponding ignition sequence, exhaust gases from an enleaned mixture and exhaust gases from an enriched mixture may alternately pass into the exhaust passage. Cylinder grouping is further elaborated with reference to the examples of FIGS. 5-6.

At 310, a first rich air-to-fuel ratio ($\lambda\_rich$) may be determined for the first cylinder group while a second lean air-to-fuel ratio ($\lambda\_lean$) is determined for the second cylinder group. The enrichment of the first cylinder group and the enleanment of the second cylinder group may be based on engine operating conditions, the number of cylinders in each group, as well as individual cylinder pre-ignition counts. As elaborated in FIG. 4, the enrichment and the enleanment over the duration may be further adjusted to maintain an exhaust air-to-fuel ratio at or around stoichiometry (or an alternate target air-to-fuel ratio). At 312, a spark ignition timing of the first cylinder group may be adjusted based on the enrichment (that is, the first rich air-to-fuel ratio), while a spark ignition timing of the second cylinder group may be adjusted based on the enleanment (that is, the second lean air-to-fuel ratio). As elaborated in FIG. 4, the spark timing adjustments may be made to maintain an overall spark ignition timing around a timing corresponding to stoichiometric engine operation.

At 314, the routine may include operating the first cylinder group rich at the first rich air-to-fuel ratio and with the first rich spark adjustment while operating the second cylinder group lean at the second lean air-to-fuel ratio and with the second rich spark adjustment. Additionally, a timer may be set to 0. The rich and lean operation of the respective cylinder groups may be continued for a first duration. The first duration may be based on the indication of pre-ignition, and on the number of cylinders in each cylinder group. The first duration may include a first number of engine cycles (e.g., a single engine cycle).

At 316, it may be determined if the first duration has elapsed. If not, the rich operation of the first group of cylinders and the lean operation of the second group of cylinders may be continued until the first duration has elapsed. After the first duration, at 318, the rich and lean operation of the cylinders may be switched. That is, at 318, the routine may include rich operating the second cylinder group, while lean operating the first cylinder group for a second duration. The second duration, like the first duration may also be based on the indication of pre-ignition, and on the number of cylinders in each cylinder group. The second duration may be the same as, or different from, the first duration. The second duration may include, for example, a second number of engine cycles, wherein the first number of engine cycles of the first duration immediately precede the second number of engine cycles of the second duration. In one example, the first duration includes a single engine cycle, and the second duration includes another single engine cycle immediately following the single engine cycle of the first duration.

In one example, for engines having an odd number of cylinders, or where an odd number of cylinders are grouped together (e.g., where the engine is a three-cylinder in-line engine, a five-cylinder in-line engine, or a four-cylinder in-line engine with only three cylinders grouped together), the first and the second duration may each include a single engine cycle. Herein, a mode change after each working cycle takes advantage of the firing order of the odd number of firing cylinders and enables exhaust gases of a leaned mixture and an enriched mixture to be discharged into a common exhaust passage in an alternating fashion.

At 320, it may be determined if the indication of pre-ignition is lowered, for example, below a threshold. In one example, this may include determining if an exhaust gas temperature estimated near the emission control device is lower than a threshold, and/or within a desired operating range. In another example, this may include determining if a knock sensor output is below a threshold. If the indication of pre-ignition is lower than the threshold, then the routine may end. Else, at 322, the controller may continue to alternate rich operation of the first cylinder group and lean operation of the second cylinder group for the first duration with lean operation of the first cylinder group and rich operation of the second cylinder group for the second duration over consecutive engine combustion cycles, until the indication of pre-ignition is lowered.

Figure 4:
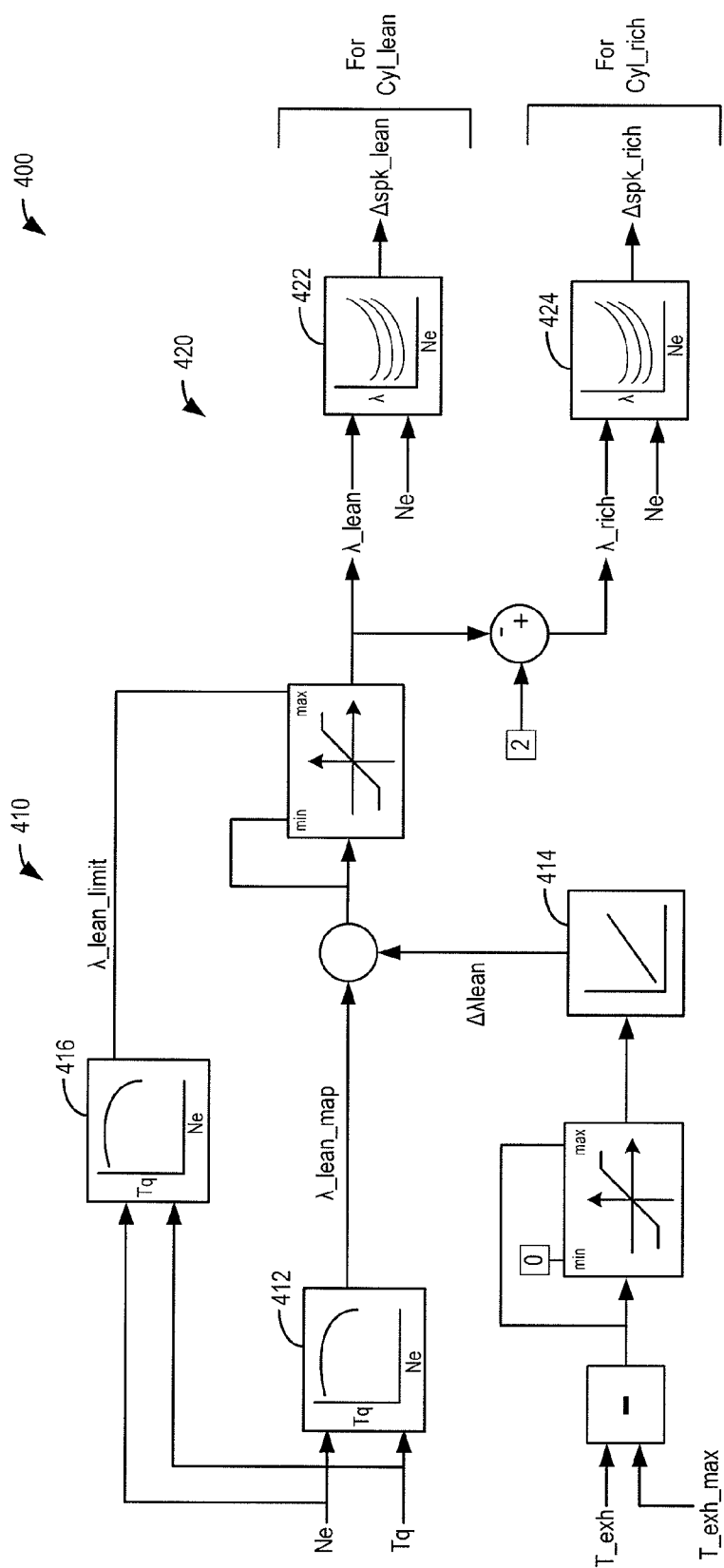
FIG. 4 shows a schematic depiction of a method of determining a lean air-to-fuel ratio and a rich air-to-fuel ratio, and corresponding spark timing adjustments, during the alternating cylinder rich and lean operation of FIG. 3.

FIG. 4 shows a schematic representation of a method for determining the air-to-fuel ratio for the cylinders to be enriched and enleaned for the specified durations. The method of FIG. 4 may be performed after cylinders have been selected and grouped for the alternating rich/lean cylinder operation. Specifically, the method of FIG. 4 determines a lean air-to-fuel ratio for the cylinders to be enleaned, and then based on the enleanment, determines a rich air-to-fuel ratio for the cylinders to be enriched, so as to maintain an overall stoichiometric exhaust. The method further determines individual cylinder spark timing adjustments to compensate for differences in cylinder torque output due to the different lambda (air-to-fuel ratio) operation. In one example, the method of FIG. 4 may be performed as part of the routine of FIG. 3, such as at 310 and 312.

As such, before initiating method 400, the controller may have grouped one or more cylinders into a first group of cylinders (Cyl_rich) scheduled for an initial cylinder enrichment (that is, operation with a sub-stoichiometric air-to-fuel ratio $\lambda$) based at least on respective cylinder pre-ignition counts and cylinder firing order. Likewise, the controller may have grouped one or more cylinders into a second group of cylinders (Cyl_lean) that are scheduled for an initial cylinder enleanment (that is, operation with a super-stoichiometric air-to-fuel ratio $\lambda$) based on their respective cylinder pre-ignition counts and firing order. In the depicted example, an initial enrichment of the first group of cylinders and an initial enleanment of the second group of cylinders may be carried out for a first duration, such as a first number of engine cycles.

Method 400 includes a first sub-routine 410 for determining a rich air-to-fuel ratio $\lambda$_rich for the first group of cylinders (Cyl_rich), and lean air-to-fuel ratio $\lambda$_lean for the second group of cylinders (Cyl_lean), for the first duration, based on engine operating conditions including engine speed (Ne) and torque. Therein, sub-routine 410 includes determining an unfiltered lean air-to-fuel ratio $\lambda$_lean_map based on engine operating conditions. In the depicted example, the unfiltered value $\lambda$_lean_map may be read from a first look-up table 412 having engine speed and torque as input variables. However, in alternate examples, the first look-up table 412 may include additional and/or different input variables, such as engine load, mean effective pressure, engine temperature, an indication of pre-ignition, cylinder pre-ignition counts, etc. The look-up table may have been generated in advance and stored in the memory of the engine controller. The unfiltered lean air-to-fuel ratio $\lambda$_lean_map, read from the map, may then be corrected with a correction value $\Delta\lambda$lean as follows:

$$\lambda\_lean = \lambda\_lean\_map + \Delta\lambda lean$$

The correction value $\Delta\lambda$lean may, in turn, be determined from a second look-up table 414 that uses a measured (or estimated) exhaust gas temperature (T_exh) and a maximum permissible exhaust gas temperature (T_exh_max) as input variables. The correction value allows the lean air-to-fuel ratio to be further enleaned, if required, so as to further reduce an exhaust gas temperature. In one example, by adjusting the lean air-to-fuel ratio based on exhaust gas temperature, a desired exhaust gas temperature range can be maintained near a downstream exhaust emission control device. It will be appreciated that the exhaust gas temperature is used herein to infer a thermal loading of the cylinder. Thus, in alternate embodiments, the correction value may be based on an alternate thermal loading indicator, or an alternate indication of pre-ignition, such as, cylinder pre-ignition counts, output from a knock sensor, cylinder mean effective pressures, etc.

As such, the excess combustion air that is available during the cylinder enleaning allows thermal loading and exhaust gas temperatures to be reduced. In particular, the excess air participates in the combustion process and is concomitantly heated, taking away heat from the cylinder. However, it may be desired to maintain the combustion mixture above a threshold degree of enleanment to enable reliable ignition and to complete combustion of the cylinder air-fuel mixture. Therefore the corrected lean air-to-fuel ratio $\lambda$_lean may be further limited by a maximum admissible lean air-to-fuel ratio $\lambda$_lean_limit such that $\lambda$_lean $\leq \lambda$_lean_limit. The maximum admissible lean air-to-fuel ratio $\lambda$_lean_limit may be determined from a third look-up table 416 stored in the controller that uses engine operating conditions, such as engine speed and torque (in the depicted example) as input variables.

The rich air-to-fuel ratio $\lambda$_rich of the first group of cylinders may be computed based on the calculated lean air-to-fuel ratio $\lambda$_lean of the second group of cylinders so that an overall exhaust air-to-fuel ratio is maintained at or near stoichiometry (that is, $\lambda \approx 1$). Since the two cylinder groups discharge their exhaust successively, the rich air-to-fuel ratio for the selected (first) group of cylinders may be calculated as:

$$\lambda\_rich = 2 - \lambda\_lean$$

In other words, the enrichment of the first group of cylinders is balanced by the enleanment of the second group of cylinders. The exhaust gas discharged from the two cylinder groups is mixed in the exhaust system, such as in a downstream common exhaust passage, so that an at least temporally averaged stoichiometric air-to-fuel ratio ($\lambda$_overall$\approx$1) is obtained downstream of the cylinder and upstream of the exhaust emission control device. Even if complete mixing of the exhaust gases does not occur, the exhaust gas charges with an excess of fuel may follow (or precede) the exhaust gas charges with an excess of air at such short intervals that a substantially stoichiometric operation can be obtained near the emission control device. In other words, the excess quantity of fuel supplied to the enriched first group of cylinders is balanced by the excess air in the enleaned second group of cylinders to generate stoichiometric exhaust.

It will be appreciated that while the depicted routine illustrates determination of a lean air-to-fuel ratio based on engine operating conditions, and calculation of a rich air-to-fuel ratio based thereon, in alternate embodiments, the routine may determine the rich air-to-fuel ratio based on engine operating conditions (from an alternate look-up table), and calculate the lean air-to-fuel ratio based thereon (that is, as $\lambda\_lean=2-\lambda\_rich$). Further, while the depicted routine illustrates adjusting the lean and rich air-to-fuel ratios to maintain the exhaust at stoichiometry, in alternate embodiments, the lean and rich air-to-fuel ratios may be adjusted to maintain the exhaust at an alternate desired air-to-fuel ratio (e.g., a target lean or rich air-to-fuel ratio).

Method 400 includes a second sub-routine 420 for adjusting cylinder spark ignition timing based on the cylinder lean and rich air-to-fuel ratios to compensate for differences in cylinder torque output. A spark ignition timing for stoichiometric operation Spk_stoich may initially be determined by the controller. The controller may then determine the spark ignition timing for the enleaned cylinders Spk_lean by correcting Spk_stoich with a lean spark correction value $\Delta$spk_lean as follows:

$$Spk\_lean=Spk\_stoich+\Delta spk\_lean,$$

wherein the lean spark correction value is read out as an output variable from a look-up table 422 that uses engine speed and the lean air-to-fuel ratio $\lambda\_lean$ as input variables. Likewise, the controller may determine the spark ignition timing for the enriched cylinders Spk_rich by correcting Spk_stoich with a rich spark correction value $\Delta$spk_rich as follows:

$$Spk\_rich=Spk\_stoich+\Delta spk\_rich,$$

wherein the rich spark correction value is read out as an output variable from a look-up table 424 that uses engine speed and the rich air-to-fuel ratio $\lambda\_rich$ as input variables.

The first group of cylinders may then be operated at an air-to-fuel ratio of $\lambda\_rich$ with a spark ignition setting of Spk_rich for the first duration while the second group of cylinders are operated at an air-to-fuel ratio of $\lambda\_lean$ with a spark ignition setting of Spk_lean. After the first duration, the air-to-fuel ratios and spark settings may be switched for a second duration. The first and second durations may be first and second number of engine cycles. In one example, the first duration may include a first engine cycle while the second duration includes a second engine cycle immediately following the first engine cycle. In one example, the rich air-to-fuel ratio used in consecutive cycles (by alternating groups of cylinders) may be the same, and the lean air-to-fuel ratio used in consecutive cycle (by alternating groups of cylinders) may likewise be the same. For example, for the first engine cycle, the first cylinder group may be enriched with an air-to-fuel ratio of $\lambda\_richI$ while the second cylinder group is enleaned with an air-to-fuel ratio of $\lambda\_leanII$. Then in the second engine cycle, the first cylinder group may be enleaned with an air-to-fuel ratio of $\lambda\_leanI$ while the second cylinder group is enriched with an air-to-fuel ratio of $\lambda\_richII$. Herein, $\lambda\_richI=\lambda\_richII$ and $\lambda\_leanI=\lambda\_leanII$.

In another example, prior to switching, the engine controller may run method 400 again to determine a new lean air-to-fuel ratio for the first group of cylinders and a new rich air-to-fuel ratio for the second group of cylinders. That is, $\lambda\_richI \neq \#\lambda\_richII$ and $\lambda\_leanI \neq \#\lambda\_leanII$. In still another example, the enrichment/enleanment of the cylinder groups may be filtered over time (e.g., over engine cycles) such that the enrichment/enleanment in each successive cycle is a function (linear, non-linear, etc.) of the enrichment/enleanment of the preceding cycle.

As such, the number of cylinders, as well as the degree of enrichment or enleanment may be changed over consecutive engine cycles as long as cylinder enrichment is alternated with cylinder enleanment. Thus, in one example, during the first engine cycle, the first cylinder group may be more enriched and the second cylinder group may be more enleaned, while during the second engine cycle, the second cylinder group may be less enriched and the first cylinder group may be less enleaned. In other words, $\lambda\_richI>\lambda\_richII$, and likewise, $\lambda\_leanI>\lambda\_leanII$. Likewise, the alternating operation does not require that the cylinders undergo a mode change after the same duration or same number of engine cycles, but merely requires that a mode change be carried out. Thus in another example, in response to the indication of pre-ignition being higher than a threshold, the first and second cylinder groups may be enriched/enleaned to a higher degree, and the enrichment/enleanment may be alternated more frequently. Further, the alternating enrichment/enleanment may be carried out for a longer duration, such as a larger number of engine cycles, and/or until the indication of pre-ignition is below the threshold. After that, the first and second cylinder groups may be enriched/enleaned to a lower degree, the enrichment/enleanment may be alternated less frequently, and/or the alternating enrichment/enleanment may be carried out for a shorter duration. In another example, the alternating cylinder operation may be stopped once the indication of pre-ignition is below the threshold.

Thus, the enrichment of the first group of cylinders and the enleanment of the second group of cylinders over a first duration, or first engine cycle can be based on engine operating conditions and an indication of pre-ignition. Likewise, the enleanment of the first group of cylinders and the enrichment of the second group of cylinders over a second duration, or second, immediately following engine cycle can be also based on engine operating conditions and the indication of pre-ignition.

In this way, on each engine cycle, at least one cylinder may be operated rich while at least another cylinder is operated lean, with corresponding spark adjustments, to maintain an exhaust around stoichiometry while reducing the likelihood of cylinder pre-ignition by reducing thermal loading of the cylinders. By alternating cylinder rich and lean operation after specified durations (e.g. after n engine cycles, or every engine cycle), issues related to continued enrichment of selected cylinders and continued enleanment of other cylinders can be reduced. For example, soot accumulation, coking of spark plugs, soot deposit on valves, misfires, and rotational speed fluctuations resulting from continued enrichment can be reduced. Likewise, frequent knocking events resulting from continued enleanment (particularly in boosted engines) can be reduced. Furthermore, pre-ignition can be mitigated without degrading exhaust emissions.

In some examples, in addition to using alternating rich/lean operation of cylinders to reduce thermal loading, engine systems may be configured to reduce the path of the heated exhaust gases from the cylinders, or groups of cylinders, to the different downstream emission control devices. This enables the exhaust gas to reach the emission control devices rapidly, and reduces the chance of exhaust gas cooling en route to the emission control device. For example, each selected cylinder may have at least one outlet for discharging exhaust gases from the cylinder, with each outlet coupled to an exhaust passage. Further, the exhaust passages of at least two cylinders may converge to form a common exhaust passage within the cylinder head of the engine, so as to form an integrated exhaust manifold. By integrating the exhaust manifold into the cylinder heads, higher thermal loading may be achieved in the engine as compared to engines, or cylinder heads, with external exhaust manifolds. This may reduce the risk of engine overheating, particularly in boosted engines. Additionally, dense packaging of the engine unit is enabled, providing size reduction benefits. In one example, the engine may be configured with two cylinder heads for two cylinder banks, with cylinder groups arranged and distributed between the two cylinder banks. In an alternate embodiment, not all of the cylinders in a cylinder head may be grouped. Rather, only some of the cylinders on a given cylinder bank may be grouped.

Figure 5:
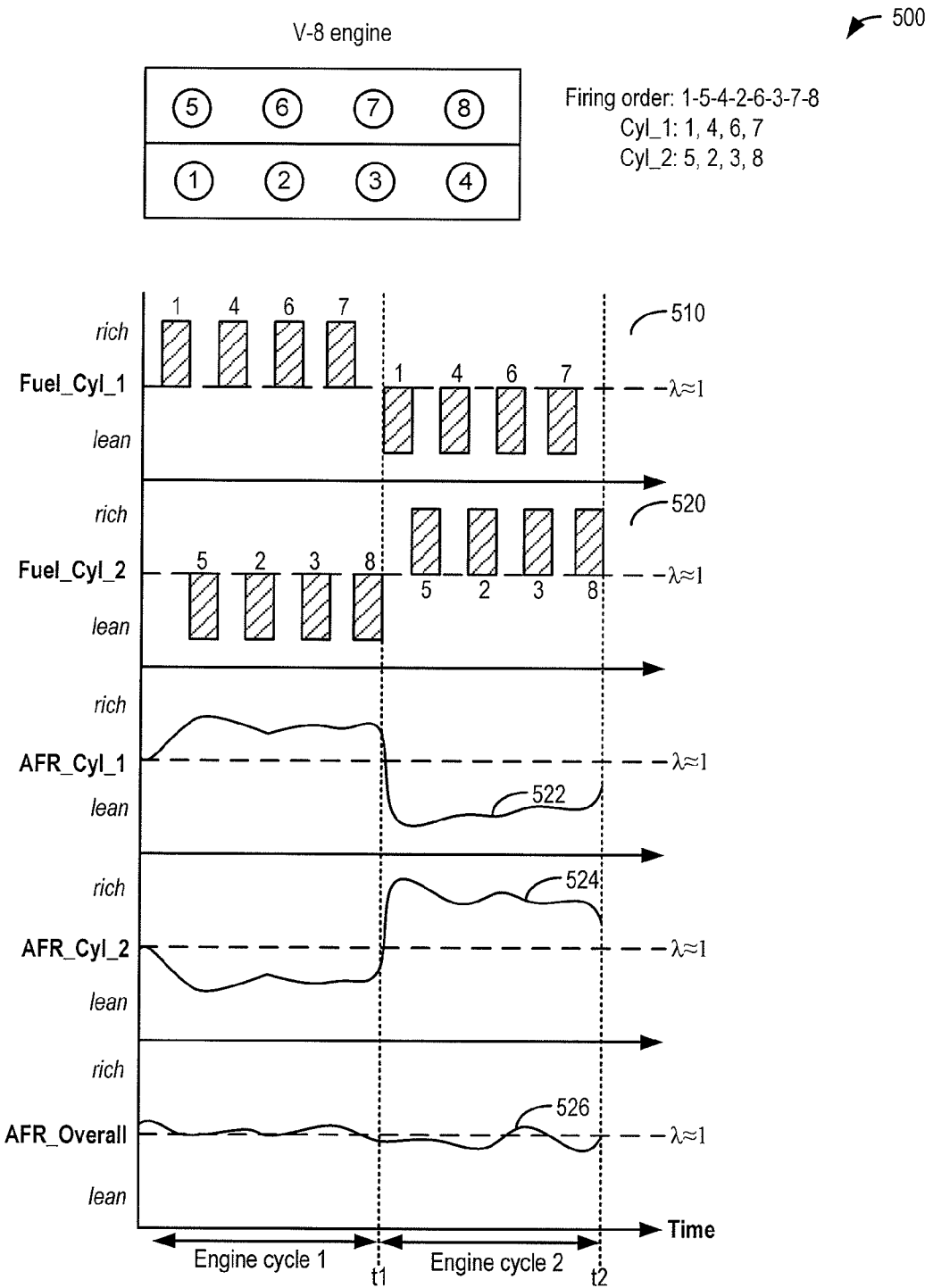
FIGS. 5-6 show example cylinder operations, according to the present disclosure.
Figure 6:
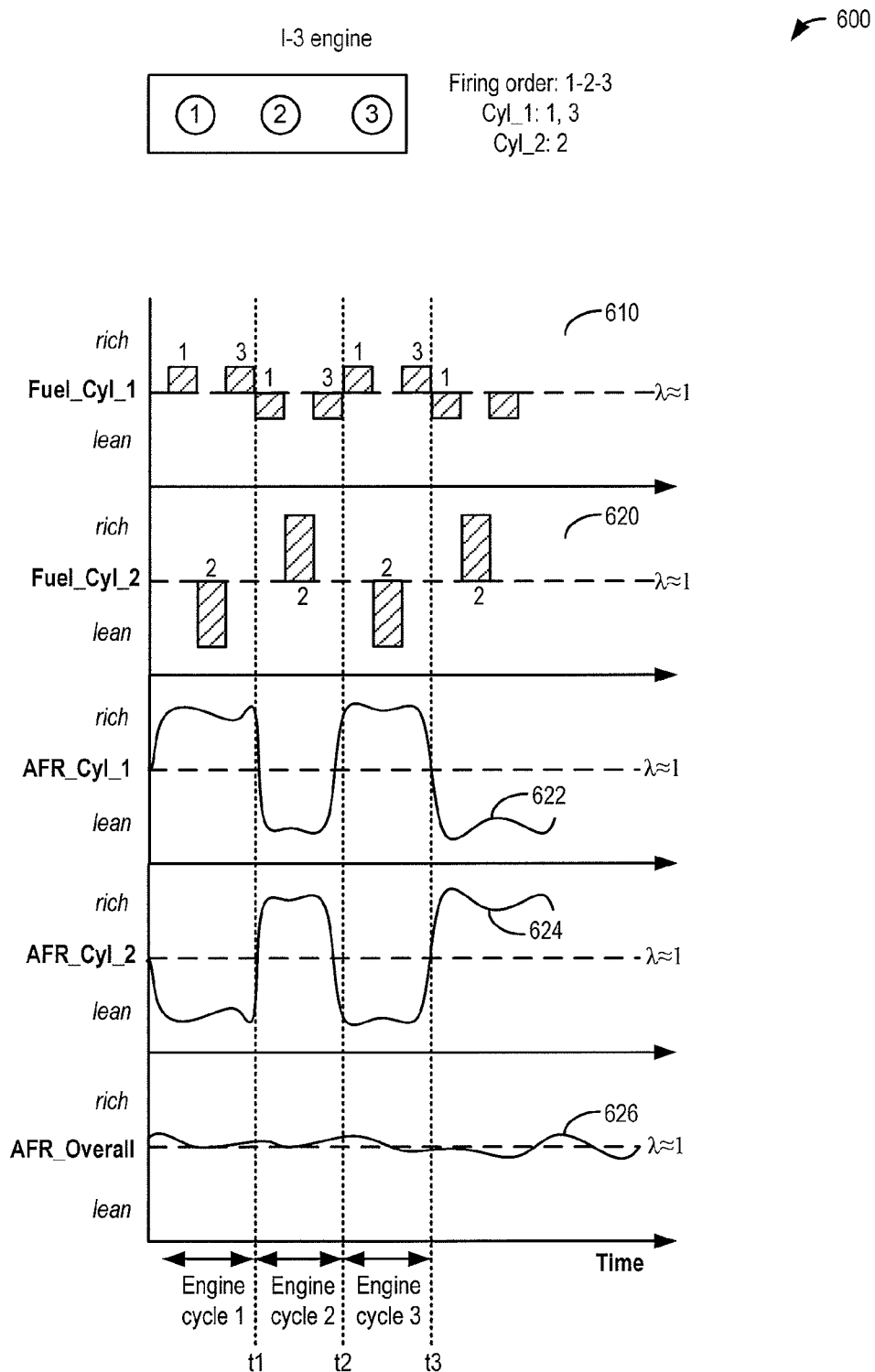

Example cylinder alternating rich/lean operations and cylinder grouping are now discussed with reference to FIGS. 5-6. FIG. 5 shows an example of symmetric grouping in a V-8 engine having 4 cylinders in each of a first cylinder group and a second cylinder group. In comparison, FIG. 6 shows an example of asymmetric grouping in an in-line I-3 engine having 2 cylinders in the first cylinder group and a single cylinder in the second cylinder group. Based on the number of cylinders in each cylinder group, and well as the firing order of the cylinders, the lean/rich operation of the cylinder groups is adjusted.

FIG. 5 shows a V-8 engine having eight cylinders numbered 1-8 based on their position in the engine. In the depicted example, the firing order of the eight cylinders is 1-5-4-2-6-3-7-8. Based on the firing order, the cylinders may be grouped so as to enable successive combustion events in a given engine cycle to be alternately rich and lean. Thus, the first cylinder group Cyl_1 may include cylinders 1, 4, 6, and 7, while the second cylinder group Cyl_2 may include cylinders 5, 2, 3, and 8. As elaborated in map 500, in response to an indication of pre-ignition, an engine controller may alternate rich cylinder operation with lean cylinder operation in one or more engine cylinders, over consecutive engine cycles. Map 500 depicts fuel injection to the cylinders of the first cylinder group (Fuel_Cyl_1) at graph 510, fuel injection to the cylinders of the second cylinder group (Fuel_Cyl_2) at graph 520, an exhaust air-to-fuel ratio of the first cylinder group (AFR_Cyl_1) at graph 522, an exhaust air-to-fuel ratio of the second cylinder group (AFR_Cyl_2) at graph 524, and an overall engine exhaust air-to-fuel ratio (AFR_Overall) at graph 526. In each graph, a fuel injection or an air-to-fuel ratio is compared to stoichiometric values (depicted as a dashed line, and $\lambda \approx 1$). A time, in terms of engine cycles, is represented along the x-axis.

The alternating operation includes, alternating rich operation of the first group of cylinders for one engine cycle with lean operation of the first group of cylinders for another immediately following engine cycle, while concomitantly alternating lean operation of the second group of cylinders for the one engine cycle with rich operation of the second group of cylinders for the immediately following engine cycle. With reference to map 500, a first engine cycle (engine cycle 1) is shown between t0 and t1, while an immediately following engine cycle (engine cycle 2) is shown between t1 and t2. During engine cycle 1, each of the four cylinders of the first cylinder group (cylinders 1, 4, 6, and 7) are rich injected (graph 510), while each of the four cylinders of the second cylinder group (cylinders 5, 2, 3, and 8) are lean injected (graph 520). As a result, an exhaust air-to-fuel ratio of the first cylinder group (graph 522) is richer than stoichiometry for the first engine cycle while the exhaust air-to-fuel ratio of the second cylinder group (graph 524) is leaner than stoichiometry for the same engine cycle. Further, as a result of the firing order of the cylinders, each successive firing over the first engine cycle has alternate rich and lean operation.

As elaborated in FIGS. 3-4, the enrichment of the first group of cylinders and the enleanment of the second group of cylinders may be calculated based on engine operating conditions (e.g., exhaust gas temperature, engine speed-load conditions, etc.) as well as indication of pre-ignition (e.g., a likelihood of pre-ignition based on a pre-ignition count of each cylinder in the first and second group of cylinders, or pre-ignition detected based on the output of a knock sensor). The enrichment and enleanment may also be based on the number of cylinders in each cylinder group. As such, the enrichment of the first cylinder group and the enleanment of the second cylinder group over the first engine cycle may be adjusted to maintain an overall exhaust air-to-fuel ratio over the first engine cycle around stoichiometry (graph 526). In the depicted example, since each cylinder group has the same number of cylinders, the enrichment of each cylinder in the first cylinder group may be the same as the enleanment of each cylinder in the second cylinder group. In an alternate example, the enrichment of each cylinder in the first cylinder group may be different from each other, and an enleanment of each cylinder in the second cylinder group may be different from each other, but the net enrichment of the first cylinder group may be balanced by the net enleanment of the second cylinder group. To account for torque differences resulting from the rich or lean operation of the cylinders, during the first engine cycle, a spark ignition timing (not shown) of each cylinder of the first group of cylinders may be adjusted based on the enrichment, and a spark ignition timing of each cylinder of the second group of cylinders may be adjusted based on the enleanment.

At the end of engine cycle 1, at t1, cylinder operation may be switched. Specifically, during engine cycle 2 (between t1 and t2), each of the four cylinders of the first cylinder group (cylinders 1, 4, 6, and 7) are lean injected (graph 510), while each of the four cylinders of the second cylinder group (cylinders 5, 2, 3, and 8) are rich injected (graph 520). As a result, the net air-to-fuel ratio of the first cylinder group (graph 522) is leaner than stoichiometry for the second engine cycle while the net air-to-fuel ratio of the second cylinder group (graph 524) is richer than stoichiometry for same engine cycle. Further, the enleanment of the first cylinder group and the enrichment of the second cylinder group over the immediately following second engine cycle may be adjusted to maintain an overall exhaust air-to-fuel ratio over the second engine cycle around stoichiometry (graph 526). As with engine cycle 1, the grouping of the cylinders results in successive firings over the second engine cycle having alternate rich and lean operation. To account for torque differences, a spark ignition timing (not shown) of the first group of cylinders is adjusted based on the enleanment, and a spark ignition timing of the second group of cylinders is adjusted based on the enrichment.

FIG. 6 shows another example of alternating cylinder operation in the context of an in-line engine having three cylinders numbered 1-3 based on their position in the engine. In the depicted example, the firing order of the eight cylinders is 1-2-3. Based on the firing order, the cylinders are grouped so as to enable successive combustion events to be alternately rich and lean. Thus, the first cylinder group Cyl_1 includes cylinders 1 and 3 (the outer cylinders), while the second cylinder group Cyl_2 includes cylinder 2 only (the inner cylinder). Map 600 depicts fuel injection to the two cylinders of the first cylinder group (Fuel_Cyl_1) at graph 610, fuel injection to the cylinder of the second cylinder group (Fuel_Cyl_2) at graph 620, an exhaust air-to-fuel ratio of the first cylinder group (AFR_Cyl_1) at graph 622, an exhaust air-to-fuel ratio of the second cylinder group (AFR_Cyl_2) at graph 624, and an overall engine exhaust air-to-fuel ratio (AFR_Overall) at graph 626. In each graph, a fuel injection or an air-to-fuel ratio is compared to stoichiometric operation (depicted as a dashed line, and λ≅1). A time, in terms of engine cycles, is represented along the x-axis.

In the depicted example, in the first engine cycle (between t0 and t1), the first group of cylinders is operated richer then stoichiometry (graphs 610 and 622) while operating the second group of cylinders leaner than stoichiometry (graphs 620 and 624). Then in the second engine cycle (between t1 and t2), immediately following the first engine cycle, the second group of cylinders are operated richer then stoichiometry while operating the first group of cylinders leaner than stoichiometry. In the third engine cycle (between t2 and t3), immediately following the second engine cycle, the first group of cylinders are once again operated richer then stoichiometry while the second group of cylinders are once again operated leaner than stoichiometry. The enrichment and enleanment on each engine cycle is adjusted to maintain an exhaust air-to-fuel ratio at or around stoichiometry (graph 626). In the depicted example, since the first cylinder group has twice the number of cylinders as the second cylinder group, the enrichment of each cylinder in the first cylinder group may be half (in amplitude) the enleanment of the single cylinder in the second cylinder group. As elaborated in FIG. 5, to account for torque differences resulting from the rich or lean operation of the cylinders, during each engine cycle, a spark ignition timing (not shown) of the enriched group of cylinders may be adjusted based on the enrichment, and a spark ignition timing of the enleaned group of cylinders may be adjusted based on the enleanment. In this way, switching may continue over consecutive engine cycles for a defined duration (e.g., defined number of engine cycles) until an indication of pre-ignition is lowered. It will be appreciated that while the examples of FIGS. 5-6 illustrate switching cylinder operation after every engine cycle, in alternate examples, the switching may occur after an alternate number of engine cycles.

In this way, a combination of rich cylinder operation with lean cylinder operation in one or more engine cylinders, over a duration, may be advantageously used to reduce thermal loading of an engine, thereby lowering the risk of abnormal cylinder combustion events related to pre-ignition and/or knocking. By periodically switching rich and lean operation in a given cylinder, issues related to continued enrichment or continued enleanment can be reduced. Specifically, misfires, speak plug coking, engine speed fluctuations, and valve operation degradation related to prolonged enrichment can be reduced, at the same time as reducing knock arising from prolonged enleanment. By compensating for cylinder torque disturbances using respective cylinder spark timing adjustments, pre-ignition can be reduced without degrading engine performance. By reducing thermal overloading while maintaining a stoichiometric exhaust air-to-fuel ratio, exhaust conditions conducive to emission control device operation may be achieved during pre-ignition control, thereby improving exhaust emissions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, comprising:
    in response to an indication of pre-ignition,
        operating a first cylinder rich while operating a second cylinder lean for a first duration; and
        after the first duration, rich operating the second cylinder while lean operating the first cylinder for a second duration, the first and second durations based on a pre-ignition count of the first and second cylinders.

2. The method of claim 1, wherein the operating a first cylinder rich while operating a second cylinder lean for the first duration is performed before a cylinder pre-ignition event is detected.

3. The method of claim 2, wherein the indication of pre-ignition is further based on an exhaust gas temperature being higher than, or expected to exceed, a threshold.

4. The method of claim 2, wherein the first cylinder and the second cylinder are selected based on the pre-ignition count of the first cylinder and the second cylinder, and further based on their firing order.

5. The method of claim 1, wherein the operating a first cylinder rich while operating a second cylinder lean for the first duration is performed after the cylinder pre-ignition event is detected.

6. The method of claim 1, wherein the first duration includes a first number of engine cycles, and wherein the second duration includes a second number of engine cycles, the first number of engine cycles immediately preceding the second number of engine cycles.

7. The method of claim 6, wherein the first duration includes a single engine cycle and wherein the second duration includes another single engine cycle immediately following the single engine cycle of the first duration.

8. The method of claim 1, further comprising, alternating rich operation of the first cylinder and lean operation of the second cylinder for the first duration with lean operation of the first cylinder and rich operation of the second cylinder for the second duration until the indication of pre-ignition is below a threshold.

9. The method of claim 1, wherein the enrichment of the first cylinder and enleanment of the second cylinder for the first duration is adjusted to maintain an exhaust air-to-fuel ratio at or around stoichiometry, and wherein the enrichment of the second cylinder and enleanment of the first cylinder for the second duration is also adjusted to maintain the exhaust air-to-fuel ratio at or around stoichiometry.

10. A method of operating an engine, comprising:
in response to an indication of pre-ignition,
operating a first cylinder rich while operating a second cylinder lean for a first duration, the enrichment of the first cylinder and enleanment of the second cylinder adjusted to maintain an exhaust air-to-fuel ratio at or around stoichiometry;
after the first duration, rich operating the second cylinder while lean operating the first cylinder for a second duration, the enrichment of the second cylinder and enleanment of the first cylinder adjusted to maintain the exhaust air-to-fuel ratio at or around stoichiometry;
during the first duration, adjusting a spark ignition timing of the first cylinder based on the enrichment and a spark ignition timing of the second cylinder based on the enleanment; and
during the second duration, adjusting a spark ignition timing of the first cylinder based on the enleanment and a spark ignition timing of the second cylinder based on the enrichment.

11. A method of operating an engine, comprising:
in response to an indication of pre-ignition, alternating rich cylinder operation with lean cylinder operation in one or more engine cylinders, over a number of consecutive engine cycles, the number based on a cylinder pre-ignition count.

12. The method of claim 11, wherein the alternating includes alternating rich operation of a first group of cylinders for one engine cycle with lean operation of the first group of cylinders for another immediately following engine cycle, while concomitantly alternating lean operation of a second group of cylinders for the one engine cycle with rich operation of the second group of cylinders for the immediately following engine cycle.

13. The method of claim 12, further comprising,
during the one engine cycle, adjusting a spark ignition timing of the first group of cylinders based on the enrichment and the second group of cylinders based on the enleanment; and
during the immediately following engine cycle, adjusting a spark ignition timing of the first group of cylinders based on the enleanment and the second group of cylinders based on the enrichment.

14. The method of claim 13, wherein the enrichment of the first group of cylinders and the enleanment of the second group of cylinders over the one engine cycle is based on the indication of pre-ignition, and wherein the enleanment of the first group of cylinders and the enrichment of the second group of cylinders over the immediately following engine cycle is also based on the indication of pre-ignition.

15. The method of claim 14, wherein the indication of pre-ignition includes a likelihood of pre-ignition based on a pre-ignition count of each cylinder in the first group and second group of cylinders.

16. The method of claim 13, wherein the enrichment of the first group of cylinders and the enleanment of the second group of cylinders over the one engine cycle is adjusted to maintain an exhaust air-to-fuel ratio over the one engine cycle around stoichiometry, and wherein the enleanment of the first group of cylinders and the enrichment of the second group of cylinders over the immediately following engine cycle is adjusted to maintain the exhaust air-to-fuel ratio over the immediately following engine cycle around stoichiometry.

17. The method of claim 11, wherein the indication of pre-ignition includes an exhaust gas temperature being higher than a threshold, and wherein the alternating is continued until the exhaust gas temperature is lower than the threshold.

* * * * *